Aug. 17, 1954  S. SABO  2,686,352
METHOD OF FORGING BRAKE HEADS
Original Filed Jan. 13, 1950  3 Sheets-Sheet 1
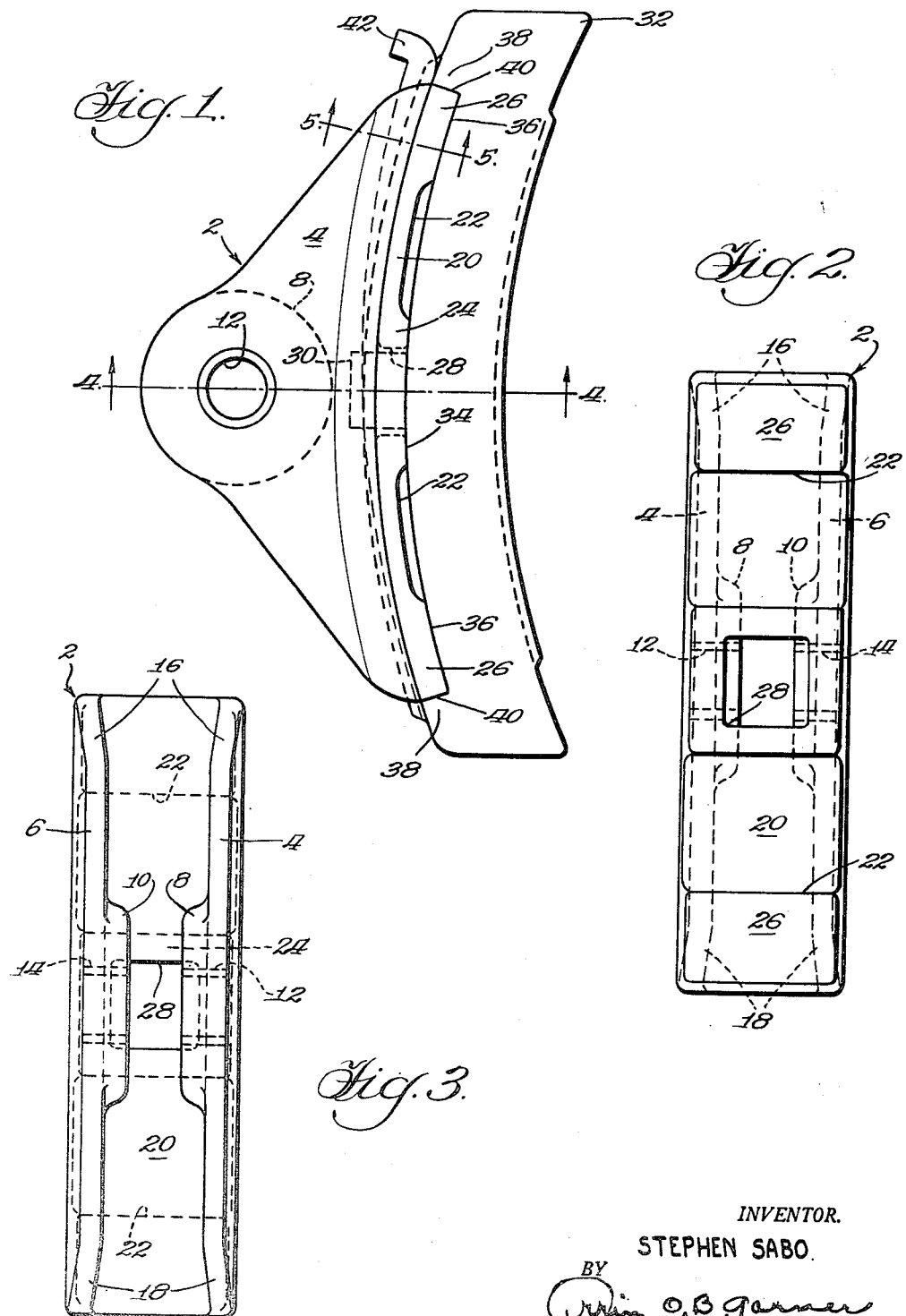
INVENTOR.
STEPHEN SABO.
BY
Orin O. B. Garner
Atty.

Aug. 17, 1954  S. SABO  2,686,352
METHOD OF FORGING BRAKE HEADS
Original Filed Jan. 13, 1950  3 Sheets-Sheet 2
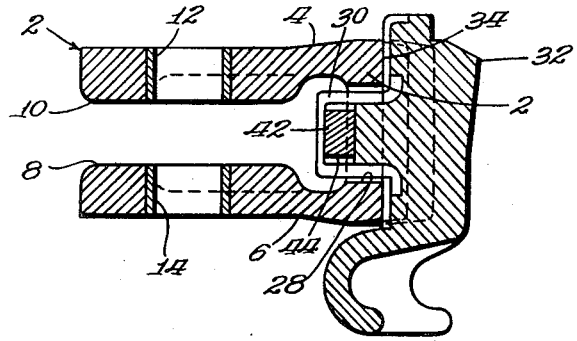
Fig. 4.
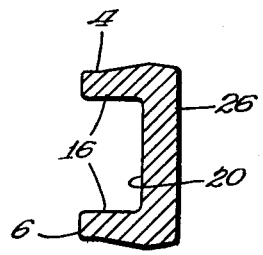
Fig. 5.
Fig. 6.
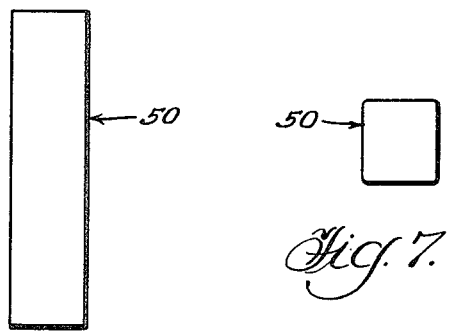
Fig. 7.
Fig. 8.
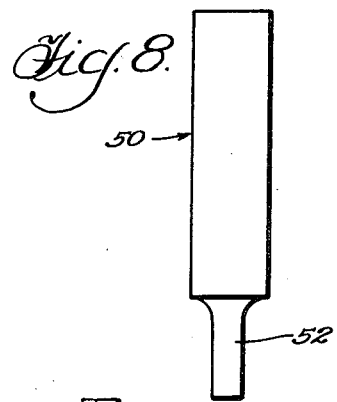
Fig. 9.
Fig. 10.
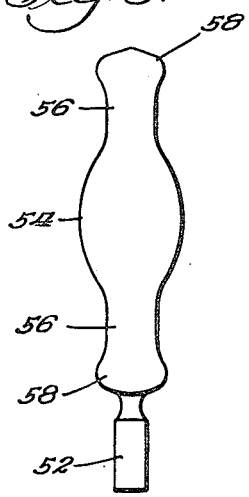
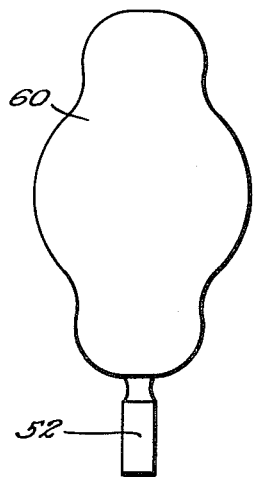
Fig. 11.
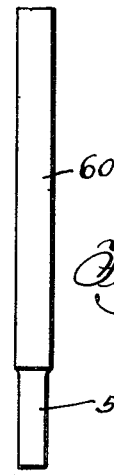
INVENTOR.
STEPHEN SABO
BY
Atty.

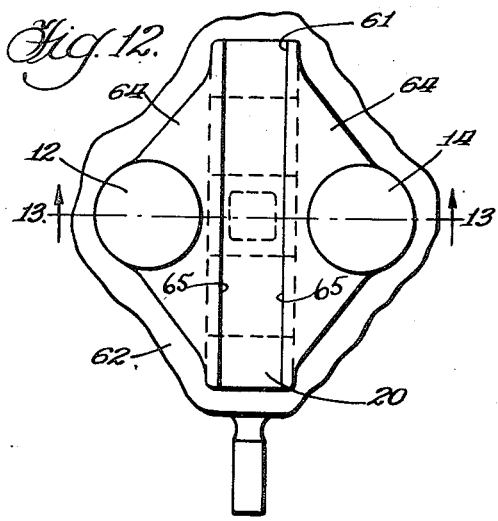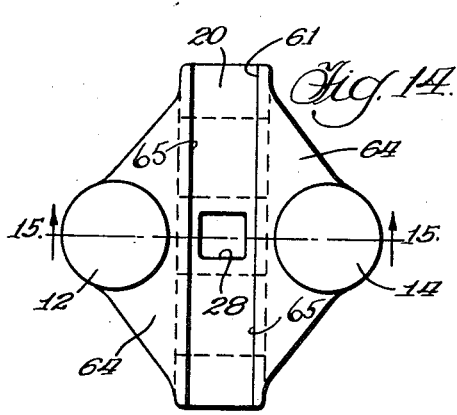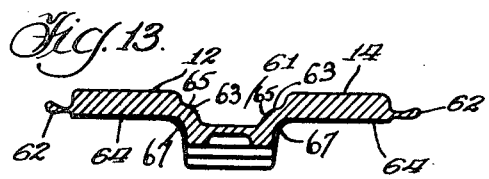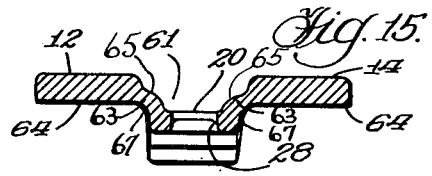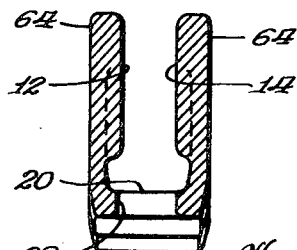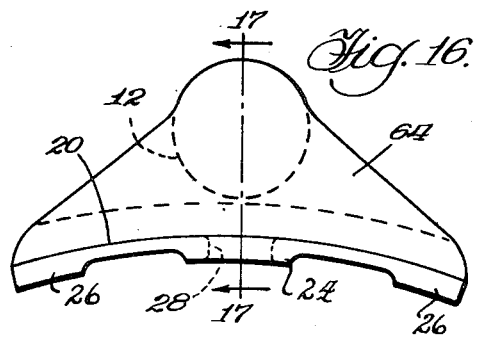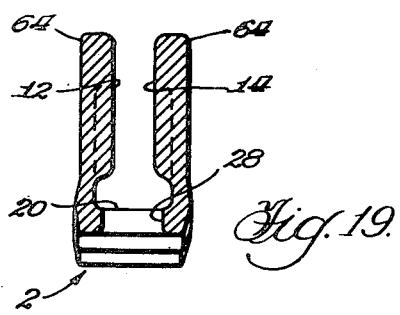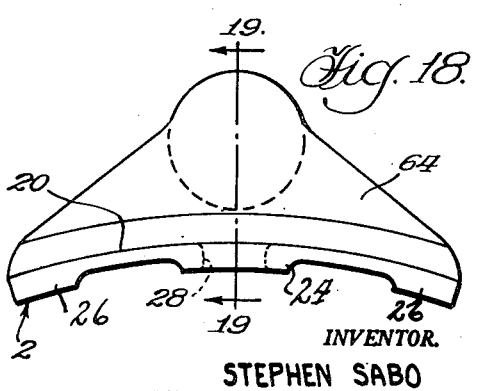

Patented Aug. 17, 1954

2,686,352

UNITED STATES PATENT OFFICE 2,686,352

METHOD OF FORGING BRAKE HEADS

Stephen Sabo, Hammond, Ind., assignor to American Steel Foundries, Chicago, Ill., a corporation of New Jersey Original application January 13, 1950, Serial No. 138,445. Divided and this application January 31, 1952, Serial No. 269,149

1 Claim. (Cl. 29—152.1)

This invention relates to a novel method of fabricating a brake head for railway brake equipment. The present application is divided out of my copending application, Serial No. 138,445, filed January 13, 1950 for Brake Head.

A general object of the invention is to devise a novel and economical method of manufacturing a brake head of the type wherein the front wall which carries the brake shoe is connected to spaced side walls which are provided with openings for the reception of pivot means for connecting the brake head to an actuator, such as a beam or lever.

A more specific object of the invention is to devise a novel method of forging a brake head, such as above described, from a standard billet of steel stock.

Another object of the invention is to forge such a brake head in such manner as to substantially eliminate residual stresses in the walls thereof.

The foregoing and other objects and advantages of the invention will become apparent from a consideration of the following specification and the accompanying drawings, wherein:

Figure 1 is a side elevational view of a brake head made in accordance with the invention with a brake shoe applied thereto;

Figure 2 is a front view of the brake head;

Figure 3 is a rear view of the brake head;

Figure 4 is a transverse sectional view taken in the plane indicated by the line 4—4 of Figure 1;

Figure 5 is a sectional view taken substantially in the plane indicated by the line 5—5 of Figure 1;

Figures 6 to 19 show the steps in a novel process by which the head is fabricated, Figure 6 being a view of one side of a billet;

Figure 7 is an end view of the billet;

Figure 8 shows the billet with a tonghold drawn;

Figure 9 shows the shaping of the billet by a rolling process;

Figure 10 is a side view of a blank formed by flattening the billet shown in Figure 9;

Figure 11 is an edge view of the blank in Figure 10;

Figure 12 shows the blank after being subjected to a forging operation;

Figure 13 is a sectional view taken on the line 13—13 of Figure 12;

Figure 14 shows the blank in Figure 12 after trimming and punching;

Figure 15 is a transverse sectional view taken on the line 16—16 of Figure 14;

Figure 16 is a side elevational view of the brake head after bending the piece shown in Figures 14 and 15;

Figure 17 is a transverse sectional view taken on the line 17—17 of Figure 16; and Figures 18 and 19 are comparable to Figures 16 and 17, respectively, and show the brake head after a coining operation, Figure 19 being a sectional view taken on the line 19—19 of Figure 18.

Describing the invention in detail, the brake head, generally designated 2, comprises spaced generally parallel side walls 4 and 6 somewhat triangular in shape in side elevation. The side walls are provided with central bearing portions 8 and 10 at their rear edges, said bearing portions projecting from the inner sides of the walls. The bearing portions 8 and 10 are aligned transversely of the brake head and are provided with aligned transverse bushed openings 12 and 14 to afford a mounting for the brake head on an associated pivot member, such as a brake beam (not shown), as will be readily understood by those skilled in the art. The upper and lower end portions 16, 16 and 18, 18 of the side walls diverge away from each other. The forward edges of the side walls are integral with the rear side of an arcuate front wall 20 which extends laterally transversely of the side walls. It will be noted that the side walls are offset intermediate their ends inwardly of the lateral edges of the front wall to provide a rigid structure.

The forward face of the front wall of the brake head has indentations 22, 22 spaced longitudinally of the front wall, the indentations being spaced in such manner as to provide a central lug 24 between the indentations and end lugs 26, 26 at the top and bottom ends of the front wall. The central lug 24 is formed with a substantially square opening 28 which is open through the front and rear sides of the front wall, said opening 28 receiving therethrough a center lug 30 on a brake shoe 32, the brake shoe extending across the front wall and seating as at 34 against the forward face of the center lug 24 and adjacent its opposite ends as at 36, 36 against the forward face of the end or toe lugs 26, 26. The brake shoe is provided with toe lugs 38, 38 at opposite ends which overlap the outer ends of the toe lugs 26, 26 and seat thereagainst as at 40, 40. The head is secured to the brake shoe by a key 42 which is disposed behind the front wall of the brake head, the key extending through a slot 44 in the center lug 30 of the shoe.

It will be noted that the central lug 24 and the toe lugs 26, 26 are formed as forwardly offset portions of the front wall and extend the full width of the front wall. This arrangement, coupled with the offsetting of the side walls inwardly of the lateral edges of the front wall of the brake head, provides an exceptionally strong and rigid brake head structure. It will be noted that the portions 16, 16 and 18, 18 of the side walls 4 and 6 are vertically coextensive with the respective toe lugs.

In the manufacture of the brake head described, billet stock 50, preferably of square cross section, is cut to appropriate length slightly longer than the length of the front wall of the brake head. The billet 50 is then subjected to a drawing operation at one end to form a tonghold 52 of reduced cross section. The billet is then subjected to a rolling operation between suitable dies, the billet being held at the tonghold 52 and rotated. The rolling operation changes the shape of the billet to provide an intermediate portions 54 somewhat ellipsoidal in shape, opposite ends of the portion 54 merging into substantially cylindrical portions 56, 56 at opposite ends thereof, the cylindrical portions being formed with bulbous end portions 58, 58. The billet is then subjected to a flattening operation (Figures 10 and 11). The flattening operation stretches the metal in a single plane to form a blank cruciform in shape with a widened center portion 60. The blank piece shown in Figures 10 and 11 is then inserted into a suitable press and subjected to a forging operation. In the forging operation the blank is flattened further and is offset intermediate its lateral edges as at 61 to provide the front wall 20 of the brake head and to provide the bosses 12 and 14 offset outwardly of the opposite side of the piece. It will be noted that the piece as viewed in Figure 12 after the forging operation is somewhat diamond-shaped and that the excess metal shown at 62 is left around the periphery. This forging operation reduces the metal thickness as at 63, 63 at the lateral edges of wall 20 and prepares the piece for bending by placing the rear surfaces 65, 65 facing away from wall 20 in tension and the opposite or front surfaces 67, 67 in compression. After a forging operation the piece is subjected to a trimming and punching operation in order to trim off the excess metal 62 and to punch the opening 28 in the center of the brake head wall 20. The piece is then subjected to a bending operation wherein portions 64, 64 at opposite edges of the wall 20 of the brake head are bent away from wall 20 toward each other to provide the spaced parallel side walls 4 and 6 of the brake head. The bending of the lateral portions of the blank to form the side walls substantially neutralizes the stresses at 63, 63. The brake head is then subjected to a coining operation whereat the side walls are offset inwardly of the lateral edges of the front wall of the brake head and the forward edges of the side walls appropriately flared. The side walls are then drilled through the bosses 4 and 6, to provide aligned openings into which the bushings are fitted.

A brake head made in accordance with this process possesses unusual strength not only because of the arrangement of the various sections thereof but also because the metal is kneaded to provide characteristic flow lines of forged metal, residual stresses are avoided, and the metal is compressed in the areas where it is most subject to wear as at the lugs 26, 26, thereby more effectively resisting wear.

I claim:

A method of manufacturing a brake head comprising the steps of forging a flat blank to compress a front wall and spaced substantially coplanar side walls so that all of said walls are substantially flat as seen in transverse cross section, while simultaneously reducing the thickness of said blank at the segments joining said front and side walls by compressing the outer surfaces of said segments to concave form and by stretching the inner surfaces of said segments to convex form, and then neutralizing the stresses in said segments by bending each segment to approximately parallel relationship with the other segment and its side wall, so that the side walls and front wall remain under compressive stresses and the stresses in the segments are substantially eliminated, then coining the side walls to offset them inwardly of the lateral edges of said front wall, and then drilling aligned pin holes through the side walls.

References Cited in the file of this patent

UNITED STATES PATENTS

| Number | Name | Date |
|---|---|---|
| 1,625,804 | Hansson | Apr. 26, 1927 |
| 1,656,930 | Whitney | Jan. 24, 1928 |
| 1,697,540 | Schoenrock | Jan. 1, 1929 |
| 1,707,778 | Witherow | Apr. 2, 1929 |
| 1,791,187 | Brauchler | Feb. 3, 1931 |
| 1,997,871 | Miller | Apr. 16, 1935 |
| 2,064,956 | Strong | Dec. 22, 1936 |
| 2,067,269 | Johnson | Jan. 12, 1937 |
| 2,268,286 | Kelly | Dec. 30, 1941 |